Figure 1:
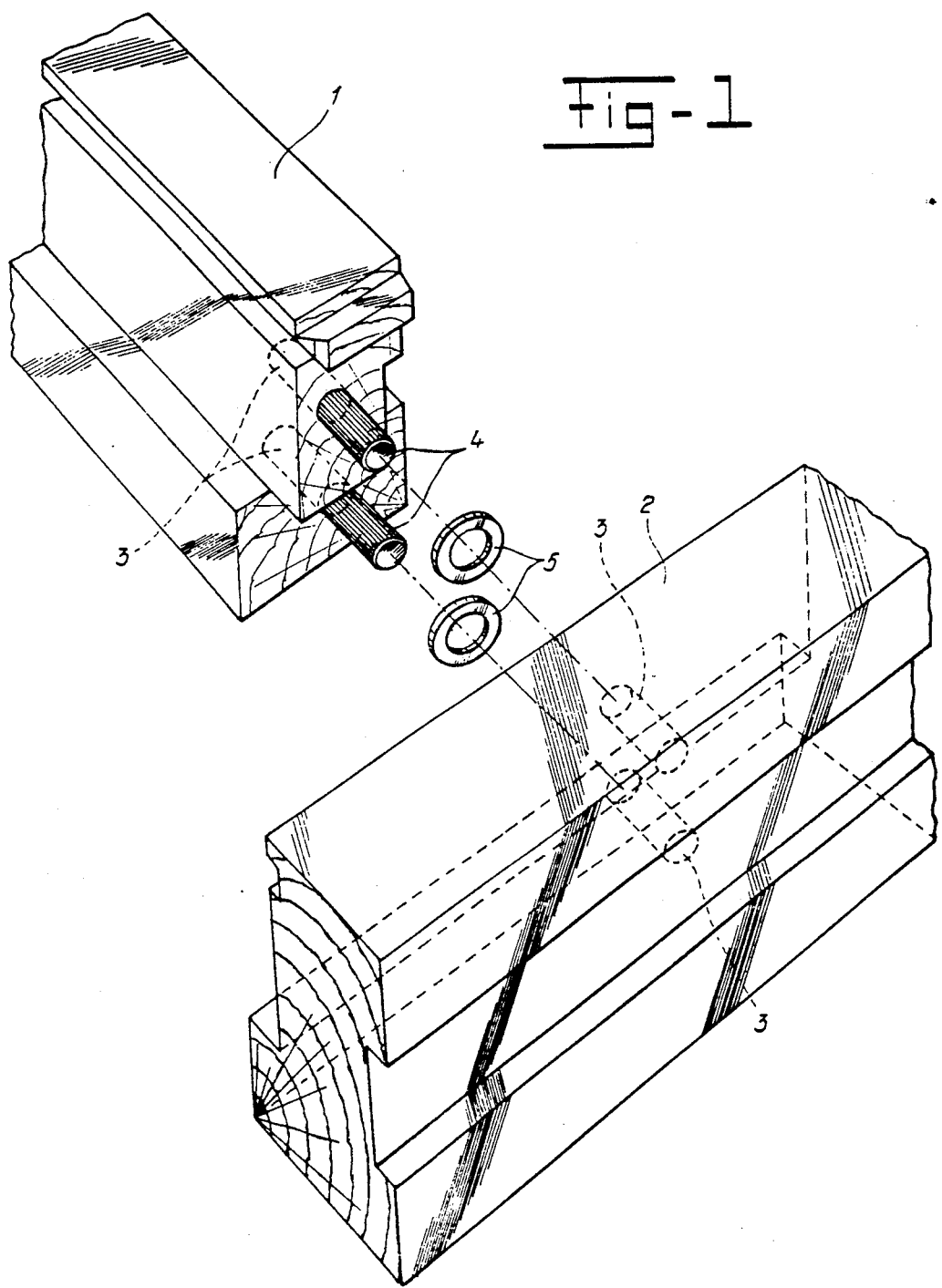

United States Patent [19]

De Jong

[11] Patent Number: 5,037,234
[45] Date of Patent: Aug. 6, 1991

[54] WOOD CONNECTION

[76] Inventor: Pieter De Jong, Bovenberg 63, 2861 BA Bergambacht, Netherlands

[21] Appl. No.: 286,358

[22] Filed: Dec. 19, 1988

[30] Foreign Application Priority Data

Dec. 18, 1987 [NL] Netherlands ............... 8703076

[51] Int. Cl.⁵ ............................................. F16B 11/00
[52] U.S. Cl. .................................... 403/268; 403/245; 403/266; 403/298; 52/585
[58] Field of Search ............. 403/266, 267, 268, 265, 403/292, 293, 298, 11, 12, 245, 246, 187; 52/585, 442, 656; 411/389, 459, 460

[56] References Cited

U.S. PATENT DOCUMENTS

| 660,308 | 10/1900 | Pixley | 403/292 |
| 685,555 | 10/1901 | Ashby | 403/267 X |
| 991,722 | 5/1911 | Hourd | 403/268 |
| 3,314,206 | 4/1967 | Dau | 52/585 X |
| 3,513,786 | 5/1970 | Kellogg | 52/585 X |
| 3,802,206 | 4/1974 | Moore et al. | 403/267 X |

FOREIGN PATENT DOCUMENTS

| 0052082 | 4/1981 | European Pat. Off. |  |
| 2646351 | 12/1977 | Fed. Rep. of Germany | 403/267 |
| 3532814 | 9/1985 | Fed. Rep. of Germany |  |
| 102287 | 3/1962 | Netherlands |  |
| 102286 | 7/1962 | Netherlands |  |
| 147506 | 6/1965 | Netherlands |  |
| 640717 | 6/1947 | United Kingdom |  |

Primary Examiner—Andrew V. Kundrat
Assistant Examiner—Franco S. De Liguori
Attorney, Agent, or Firm—Webb, Burden, Ziesenheim & Webb

[57] ABSTRACT

A wood connection is concerned with at least two wooden members glued together, having a distance piece fitted therebetween. The distance piece covers only a relatively small part of the area of abutment between the two (or more) wooden members, the remainder of the area of abutment being filled with permanently elastic glue. The mutual positioning of the wooden members is achieved with dowels and receiving holes therefor.

11 Claims, 4 Drawing Sheets

WOOD CONNECTION

The invention is concerned with a wood connection comprising at least two wooden members glued together. Each wooden member has a contact face, with the at least two contact faces defining an area of abutment between the two wooden members. Each wooden member is provided with aligned bores to receive dowel pins and the area of abutment incorporates at least one distance piece fitted between the wooden members, said distance piece traversing a limited portion of the area of abutment between the members to be connected and wherein along the circumference of the distance piece and between the members to be connected, a permanently tough elastic layer of glue is applied.

A wood connection of this type is known from the Dutch patent specification 102.287. According to this publication, distance pieces are fitted between two members to be connected. These distance pieces are slightly smaller than the contact faces of the members to be connected, so that after having fitted said distance pieces a relatively shallow circumferential groove remains. This groove is filled with elastic cement after having fitted the distance pieces. According to this publication problems arising from rot and use of the connection should be eliminated. However, it appears that this is incorrect. Due to weather influences and seasonal changes and influences related to the use of the connection, the wood will crimp and expand. Very large stresses result from this in the wood connection. With the type of wood connection according to the Dutch patent publication, therefore, the disadvantages of the state of the art persist, which disadvantages doubtless lead to cracks within one or more of the glued surfaces between the distance pieces and the wooden member.

The present invention aims to eliminate this disadvantage.

In the wood connection described above, this aim is achieved according to the present invention in that the portion of the area of abutment between the members to be connected, as defined by the layer of glue, is appreciably larger than the portion of the area of abutment which is defined by the distance piece.

Since now the greater part of the area of abutment is filled with a tough elastic layer of glue, a delatation seam is formed. The dimension of the distance piece is so small that it cannot influence the crimping and expanding motions of the members to be connected, in contrast to the state of art method. Thanks to this, the crimping and expanding motions at the connection can now be absorbed and no cracking of the glued connection will take place, eliminating the problem of rot. According to the invention a totally new perception is concerned, in that it is incorrect to design the structure so stiff that stresses acting in it could be detrimental, and that it is therefore more appropriate to create a structure having a certain limited flexibility provided thereto.

According to a preferred embodiment, the distance pieces are made from wood or a wood-glue-accepting material. Consequently, the distance pieces can be applied in the layer of glue and they can contribute to the strength of the connection. This is of influence especially in case the wood connection according to the invention is applied to well known structures, from which the glue-surface is calculated without taking into account the presence of the distance pieces according to the invention in the layer of glue.

To reduce further the influence of the strength reduction due to application of the distance pieces, these distance pieces can take the shape of discs provided with at least one opening.

According to another preferred embodiment the distance piece is made in the form of a ring-shaped disc surrounding the dowel pin. According to another embodiment of the wood connection, there is provided an appreciable clearance between the dowel pin and the receiving hole in its respective wood member. This configuration prevents any direct resting of the dowel pin upon the wall of the bore. By filling this clearance with glue, the same type tough elastic connection is achieved between the dowel and its receiving wood member as is achieved between the two wood members to be connected.

According to another preferred embodiment, the nominal outside diameter of the dowel pin is considerably smaller than the bore of the hole to receive glue in between. When making a dowel-hole connection, typically the difficulty is encountered in that either the bore has to be made with a predetermined depth or the dowel pin has to be introduced into the hole to a predetermined depth. To solve this problem and at the same time to provide for a distance piece, the dowel pin can incorporate a shoulder, which shoulder on the one hand functions as distance piece yet at the same time serves as a stop for the dowel pin. If the dowel pin incorporates a shoulder, then the depth of the corresponding bore is no longer critical and the placement of the dowel pin becomes very simple.

According to a further preferred embodiment the distance piece is shaped as a cam, extending along the circumference of at least one of the members to be connected. This cam can be integral with the member to be connected and can be made by machining. At least one of the contact faces of the members to be connected can in addition be provided with a receiving groove shaped to accommodate it. In doing so a sufficient volume is created to contain superfluous glue in order to form an extra buffer to accommodate changes of shape resulting from the warping of wood, without compromising the water tightness of the connection.

Below, the invention will be explained in greater detail referring to the examples of execution in the attached drawings.

Figure 2:
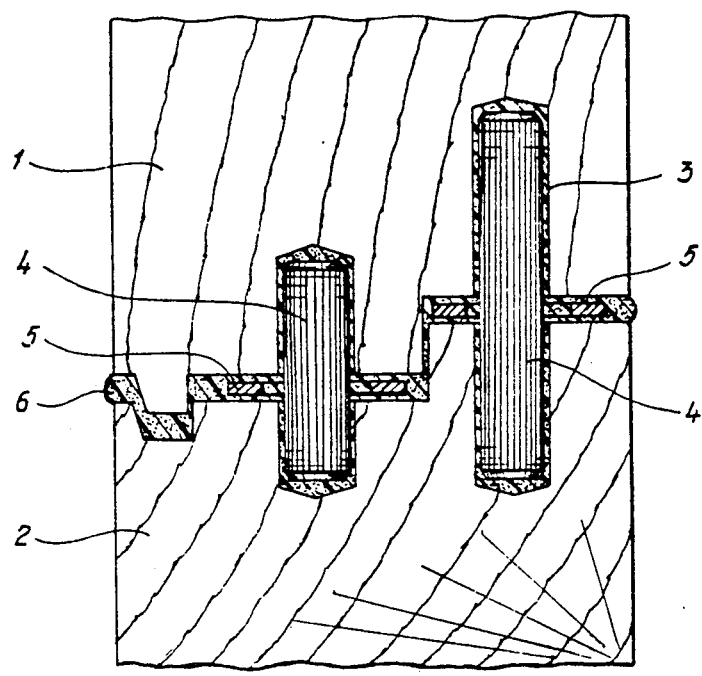
Figure 3:
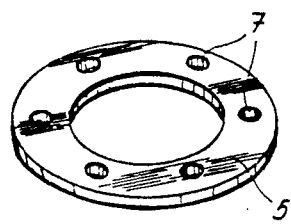
Figure 4:
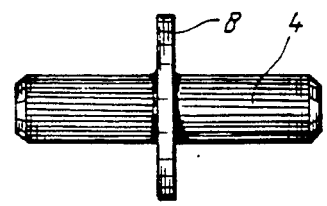
Figure 5:
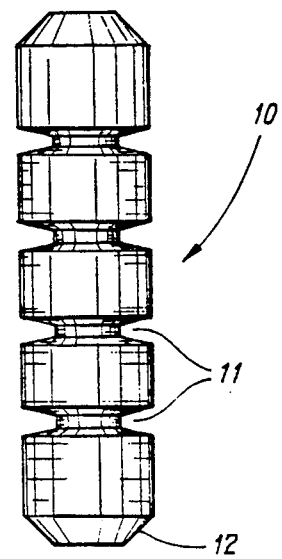
Figure 6:
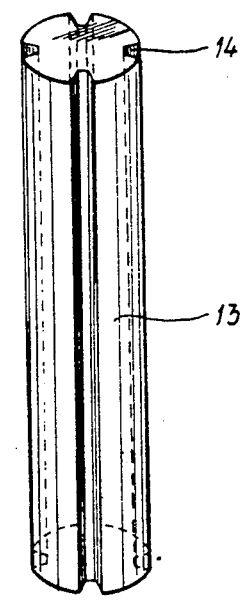
Figure 7:
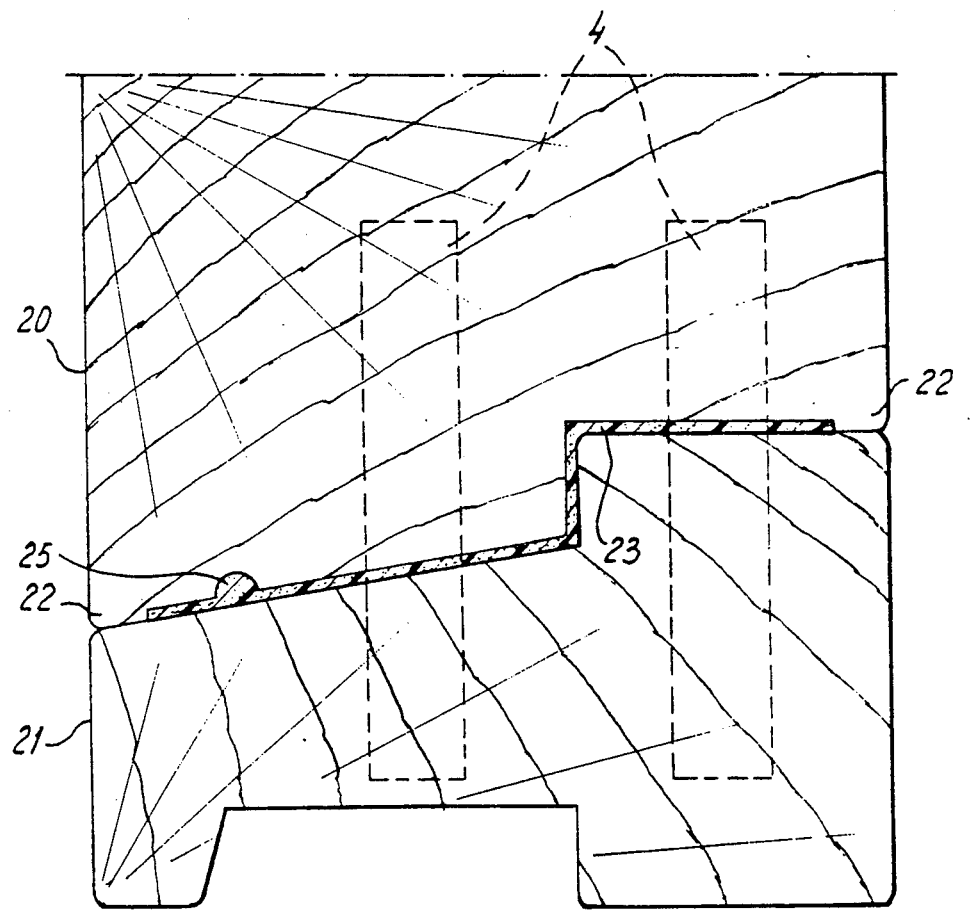

FIG. 1 illustrates an exploded view of the present wood connection,

FIG. 2 illustrates the connection according to FIG. 1 in cross section of an assembled connection, FIG. 3 illustrates another embodiment of a distance piece, FIG. 4 illustrates a dowel pin combined with a distance piece, FIG. 5 illustrates a dowel pin in which radially extending circumferential grooves are introduced, FIG. 6 illustrates a dowel pin with lengthwise extending grooves and FIG. 7 illustrates a further preferred embodiment of a connection, according to the invention, which incorporates a distance piece.

In FIG. 1 a wood connection is illustrated of a type which for instance can be applied in housefront-timber work. It is made up of wooden members 1 and 2 to be connected. To provide for said connection in both members 1, 2 there are incorporated bores 3 to receive dowel pins 4. Around these dowel pins 4 ring-shaped discs 5 can be placed of which the inner diameter is appreciably larger than the outside diameter of the dowel pins 4. The ring-shaped discs are preferably made of wood, wood-like materials or wood-glue accepting fibers or plastics. For assembling of the members illustrated in FIG. 1, glue is applied. The glue is also applied in the bores 3, before the dowel pins 4 are introduced. For this purpose the diameter of the dowel pins 4 is appreciably smaller than the bore of the holes 3 to retain glue between them, as FIG. 2 illustrates. From FIG. 2 it can be further derived that, thanks to the distance pieces, the layer of glue 6 has an important thickness. Here it can be observed that the layer of glue has a thickness greater than the thickness of the distance piece. This is in absolute contrast to the glued connection according to general practice, in which a layer as thin as possible is applied. In contrast to the state of the art, the type of glue used here according to the invention is of a type which after curing stays permanently tough elastic, so that some movement (expansion) between the members 1, 2 is allowed, without running the danger that the connection will be broken due to overloading the layer of glue, or due to breaking of the adjacent wood, as is a well known phenomenon. In this way, changes of the dimensions due to the influence of temperature and humidity can be accommodated. Glue types such as polyurethane or epoxy-based glues can be used, forming a tough elastic connection with a considerable breaking strength under tension. From FIG. 2 it follows that between the ring discs 5 and the dowel pins 4, an interval is left in which glue is present to have the surface to be glued near the dowel pin as large as possible. Further to increase this glue-surface, the ring discs, according to FIG. 3, can be provided with openings 7. To solve the problems which may arise with regard to the correct position of the dowel pins in the bores, which may be solved by drilling the holes deliberately to a predetermined depth, it is simple to provide the dowel pin 4 with a shoulder 8, as illustrated in FIG. 4, which at the same time serves as distance piece. Thanks to this design, the depth of the bores in the members 1 and 2 is no longer critical.

Said shoulder 8 can be provided with (not illustrated) openings like the lay-out according to FIG. 3. In FIG. 5, a further embodiment of the dowel pin is illustrated, reference at 10. This dowel has radial grooves 11, which may continue along the whole circumference or over only a part of it. As an example, the base of the groove 11 can have a width of 2 mm and opens at the circumference to a width of 4 mm. Furthermore the dowel pin 10 can be chamfered at the ends 12. Thanks to this design, the dowel pin 10 can more easily be introduced in the corresponding hole. The grooves 11 and the spaces formed by the chamfer 12 provide the extra space necessary to take glue to contribute in the tough elastic glue connection. Notwithstanding the above, the outside diameter of the dowel pin 10 still can be appreciably smaller than the corresponding bore.

In FIG. 6 another embodiment of the dowel, dowel 13, is illustrated. It has lengthwise extending grooves 14. These grooves for instance can have the same shape as the grooves 11, illustrated in FIG. 5. Of course it is possible to provide the dowel pins with many different types of cavities. Furthermore, the receiving bore can also be filled with glue, provisionally in combination with the illustrated embodiments of the dowel pins with non-smooth surface. In FIG. 7 another embodiment of the distance piece is illustrated. Member 20 is provided with cam surface 22. Between them and between the members 20 and 21 a space is defined, which may have a thickness of 1 to 2 mm, for taking up glue 23. The dowel connection serves the well known purpose according to general practice and is for this reason only schematically indicated. In member 20 there is furthermore provided an extending groove 25, which serves to collect superfluous glue and which forms an extra buffer volume to deal with possible changes of dimensions and shape of the wood.

Although the invention has been described above in view of preferred embodiments, it should be understood that for the expert many alterations can be applied without leaving the scope of the present invention. For instance, the distance pieces can be shaped differently from ring-discs.

I claim:

1. Wood connection comprising at least two wooden members, each having a contact face thereon, which are adhered together with glue along each of said contact faces, said contact faces defining an area of abutment between said two wooden members, said wooden members being provided with bores which in the fixed position of the connection are aligned for receiving dowel pins and having therebetween within said area of abutment at least one distance piece, said distance piece extending over a limited portion of said area of abutment, and in which along the circumference of said distance piece and between the members to be connected a permanently tough elastic layer of glue is applied, characterized in that the portion of said area of abutment defined by said permanently tough elastic layer of glue is considerably larger than the portion of said area of abutment defined by said distance piece, further characterized in that said permanently tough elastic layer of glue has a thickness greater than the thickness of said distance piece, and further characterized in that the nominal outside diameter of at least one of said dowel pins is appreciably smaller than the respective aligned bore, in order to retain glue therebetween.

2. Wood connection according to claim 1, in which said distance piece is made of wood-glue accepting materials.

3. Wood connection according to claim 2, in which said distance piece comprises a disc provided with at least one opening.

4. Wood connection according to claim 2, in which said distance piece comprises a ring-shaped disc which surrounds the dowel pin.

5. Wood connection according to claim 1, in which the dowel pin is provided with recesses at its circumferential surface.

6. Wood connection according to claim 5, in which the dowel pin is provided with a shoulder, which shoulder comprises said distance piece.

7. Wood connection according to claim 1 in which the glue is of a tough elastic type, based on polyurethane or epoxy, with reinforcing fibers.

8. Wood connection comprising at least two wooden members, each having a contact face thereon, which are adhered together with glue along each of said contact faces, said contact faces defining an area of abutment between said two wooden members, said wooden members being provided with bores which in the fixed position of the connection are aligned for receiving dowel pins and having therebetween within said area of abutment at least one distance piece, said distance piece being made of wood-glue accepting materials and comprising a ring-shaped disc which surrounds one of said dowel pins, said distance piece extending over a limited portion of said area of abutment, and in which along the circumference of said distance piece and between the members to be connected a permanently tough elastic layer of glue is applied, characterized in that the portion of said area of abutment defined by said permanently tough elastic layer of glue is considerably larger than the portion of said area of abutment defined by said distance piece, further characterized in that said permanently tough elastic layer of glue has a thickness greater than the thickness of said distance piece, further characterized in that the nominal outside diameter of at least one of said dowel pins is appreciably smaller than the respective aligned bore, in order to retain glue therebetween, and further characterized in that the internal diameter of said ring-shaped disc is appreciably larger than the outside diameter of said one of said dowel pins.

9. Wood connection comprising at least two wooden members, each having a contact face thereon, which are adhered together with glue along each of said contact faces, said contact faces defining an area of abutment between said two wooden members, said wooden members being provided with bores which in the fixed position of the connection are aligned for receiving dowel pins and having therebetween within said area of abutment at least one distance piece, said distance piece extending over a limited portion of said area of abutment, and in which along the circumference of said distance piece and between the members to be connected a permanently tough elastic layer of glue is applied, characterized in that the portion of said area of abutment containing only said tough elastic layer of glue is considerably larger than the portion of said area of abutment defined by said distance piece, is further characterized in that said permanently tough elastic layer of glue has a thickness greater than the thickness of said distance piece, is further characterized in that the nominal outside diameter of at least one of said dowel pins is appreciably smaller than the respective aligned bore, in order to retain glue therebetween, and further characterized in that said distance piece is cam-shaped, which cam extends along the circumference of at least one of the members to be connected.

10. Wood connection according to claim 9 in which the cam is integral with one of the members to be connected.

11. Wood connection according to claim 10 in which at least one of the members to be connected is provided with a groove-shaped recess.

* * * * *